United States Patent
Allmendinger et al.

(10) Patent No.: US 6,394,647 B1
(45) Date of Patent: May 28, 2002

(54) METHOD AND DEVICE FOR DETERMINING GAS PRESSURE AND TEMPERATURE IN AN HOLLOW SPACE

(75) Inventors: Klaus Allmendinger, Bachhagel; Martin Hart, Leinfelden; Robert Loisch, Boeblingen; Matthias Scherer, Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/463,160
(22) PCT Filed: Jul. 15, 1998
(86) PCT No.: PCT/EP98/04399
§ 371 (c)(1), (2), (4) Date: Apr. 17, 2000
(87) PCT Pub. No.: WO99/05494
PCT Pub. Date: Feb. 4, 1999

(30) Foreign Application Priority Data

Jul. 29, 1997 (DE) .......................... 197 31 329

(51) Int. Cl.$^7$ ................................ G01K 1/08
(52) U.S. Cl. ................ 374/142; 374/143; 374/144
(58) Field of Search ................ 374/117, 119, 374/143, 144, 141; 73/708, 702, 703

(56) References Cited

U.S. PATENT DOCUMENTS

| 4,299,117 A |   | 11/1981 | Andrews et al. |
| 4,610,551 A | * | 9/1986 | Shah .......................... 374/117 |
| 4,650,346 A | * | 3/1987 | Tehon ......................... 374/117 |
| 4,676,663 A | * | 6/1987 | Tehon ......................... 374/117 |
| 5,360,268 A | * | 11/1994 | Hayashi et al. ............. 374/117 |
| 5,551,233 A | * | 9/1996 | Tomoiu ........................ 60/595 |
| 5,578,993 A | * | 11/1996 | Sitabkhan et al. .......... 340/501 |
| 5,641,231 A | * | 6/1997 | Inaba ........................ 374/137 |
| 5,667,493 A | * | 9/1997 | Janacek .................... 604/96.01 |
| 5,791,145 A | * | 8/1998 | Freen .......................... 60/603 |
| 5,974,893 A | * | 11/1999 | Balcarek et al. ............. 73/714 |
| 6,062,087 A | * | 5/2000 | Vovan ........................ 374/143 |
| 6,142,020 A | * | 11/2000 | Kim et al. ................. 73/117.3 |
| 6,299,349 B1 | * | 10/2001 | Steinel et al. .............. 374/143 |
| 6,301,973 B1 | * | 10/2001 | Smith ..................... 73/861.27 |

FOREIGN PATENT DOCUMENTS

DE 40 10 609 A1 10/1990

* cited by examiner

Primary Examiner—Christopher W. Fulton
Assistant Examiner—Yaritza Guadalupe
(74) Attorney, Agent, or Firm—Crowell & Moring LLP

(57) ABSTRACT

The invention provides for a method and device for determining a gas pressure and temperature in a hollow space, including a fuel/air mix in an internal combustion engine combustion chamber. According to the invention, pressure and temperature are detected by means of a measuring element (5) of an ultrasound transducer/pressure sensor combined unit, said measuring element acting both as a pressure measuring element and an ultrasound transducer element to determine temperature. Therefor, said measuring element can be operated at given moments, on one hand as a pressure measuring element and on the other hand as an ultrasound transducer element or continuously, as a pressure measuring element, and furthermore as an ultra-sound transducer element superimposed with the latter. In that case, it is provided that signals should be conveniently separated for the measuring element output signal. The invention can be used, for instance, to determine air volumes for car internal combustion engines.

9 Claims, 1 Drawing Sheet

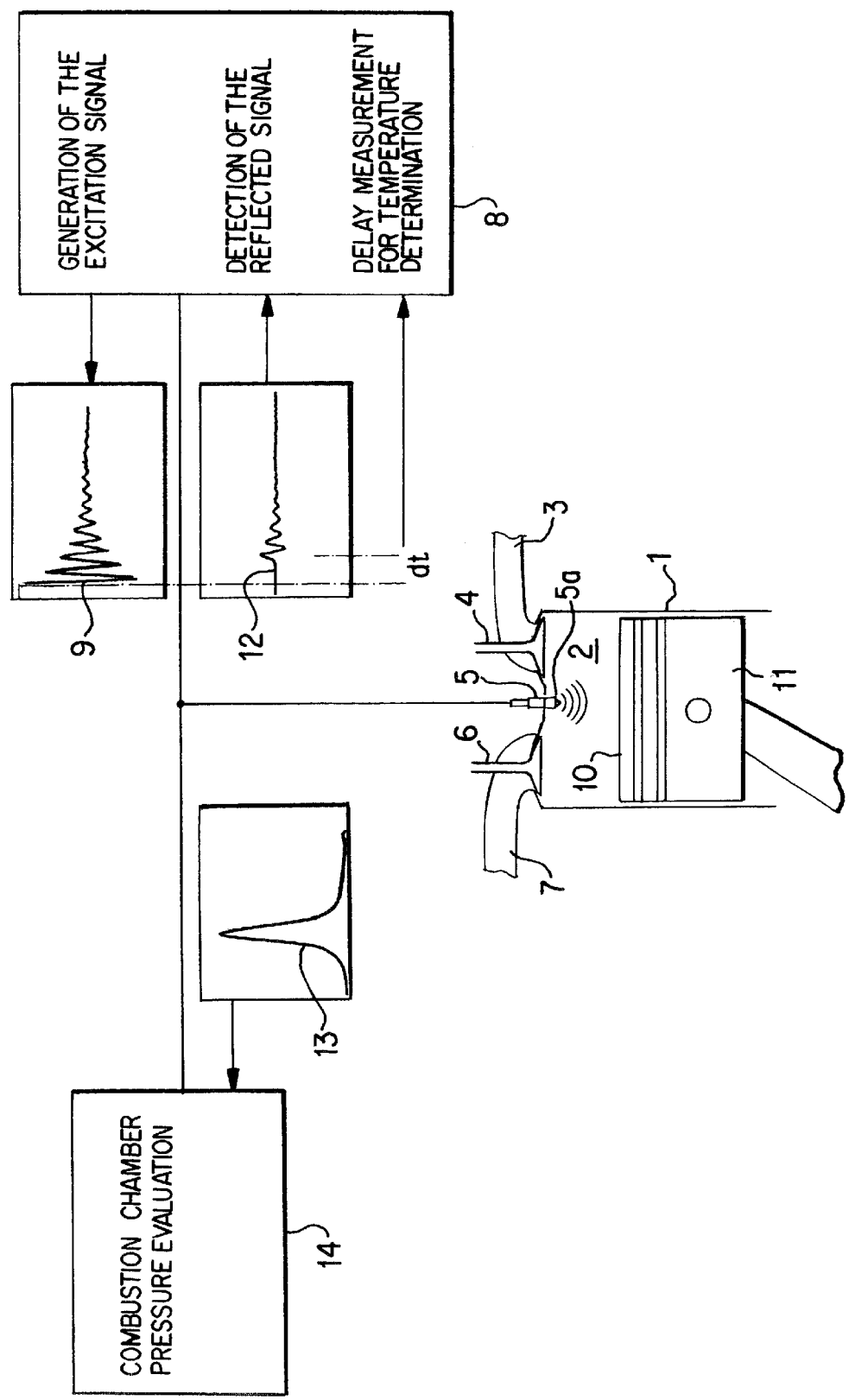

METHOD AND DEVICE FOR DETERMINING GAS PRESSURE AND TEMPERATURE IN AN HOLLOW SPACE

BACKGROUND AND SUMMARY OF THE INVENTION

This application claims the priority of PCT/EP98/04399, filed Jul. 15, 1998 and German patent document 197 31 329.9, filed Jul. 22, 1997, the disclosures of which is expressly incorporated by reference herein.

The invention relates to a method and apparatus for determining the pressure and temperature of a gas in a hollow space, and in particular of a fuel/air mixture in the combustion chamber of an internal combustion engine.

Known devices for determining the pressure and temperature of a fuel/air mixture in a combustion chamber of an internal combustion engine include as independent sensor components, a pressure-detecting element for sensing the pressure and a separate separately from it, a temperature-detecting element for sensing the temperature. The determination of the pressure and temperature of the fuel/air mixture in the combustion chamber is useful for sensing or monitoring the processes inside the engine, in particular for determining the engine load.

Engine load can be determined relatively accurately in steady-state operation of an engine, by measuring the throttle angle, measuring the intake pipe pressure using an appropriately positioned pressure sensor together with a measurement the temperature in the intake pipe, or by measuring the air mass by means of a hot-film air mass flowmeter. Deviations occur, however, in non-steady-state operation due to filling effects of the intake pipe, back-flow effects of residual gas in the valve overlap phase and pulsations in the intake pipe.

The use of cylinder pressure sensors (pressure sensors which are positioned in the respective combustion chambers of the engine cylinder) allows the air mass in the combustion chamber to be determined after closing of the inlet valves, by evaluating the pressure variation in the compression phase, without the determination being influenced by non-steady state effects. For this purpose, the ideal gas equation is used to calculate the cylinder charging. The required absolute pressure value can be calculated on the basis of the relative pressure sensed by means of the cylinder pressure measurement at a defined crank angle position, by a thermodynamic Pischinger zero correction, or by an intake pipe pressure equalization shortly before the closing of the inlet valve. The volume of the combustion chamber can be calculated using the crank angle and engine-specific data. The gas constant, also entered in the ideal gas equation, is known and can be regarded as approximately constant during the compression phase. If the temperature in the combustion chamber is then also measured, the charging mass can be determined from the ideal gas equation.

German Patent Document DE 40 10 609 A1 discloses a device for determining the pressure and temperature of a fuel/air mixture in the combustion chamber of an internal combustion engine, which forms an integrated part of a spark plug. The spark plug has a center electrode arranged in a tubular insulator and has a hollow portion surrounding a thermocouple which senses the temperature of the front end of the center electrode and consequently the combustion chamber temperature. The spark plug also has a metallic casing with a retaining seat around an outer surface of the casing. An annular pressure sensor is arranged on the retaining seat in such a way that it senses the combustion chamber pressure in a cylinder head, and the pressure sensor is arranged as an intermediate layer between the retaining seat and the cylinder head when the spark plug has been securely connected to the cylinder head of the internal combustion engine.

As an alternative to the use of thermocouples of this and similar types, it is known to determine the temperature of a fuel/air mixture in the combustion chamber of an internal combustion engine by ultrasonic delay measurement. See the Laid-open Patent Application DE 44 42 078 A1 and the papers appearing in journals, J. C. Livengood et al., Ultrasonic Temperature Measurement in Internal Combustion Engine Chamber, The Journal of the Acoustical Society of America, Vol. 26, No. 5, September 1954, Page 824 and G. Hohenberg, Gastemperatur-Meßverfahren durch Laufzeitmessung von Ultraschallimpulsen—ein neuer Weg zur Erfassung innermotorischer Vorgänge (gas-temperature measuring method by delay measurement of ultrasonic pulses—a new way of sensing processes inside an engine), Automobil-Industrie 2/75, Page 25. The first-mentioned paper discloses a device for determining the pressure and temperature of a fuel/air mixture in the combustion chamber of an internal combustion engine which comprises not only an ultrasonic delay measuring device but also a separate, independent pressure-measuring element for sensing the combustion chamber pressure. The last-mentioned paper describes the principle of temperature determination from ultrasonic delay (transit time) measurements using the known relationship for the speed of sound in a gas, dependent only on the gas constant, the quotient of the thermal capacities at constant pressure and at constant volume as well as the temperature. The distance required for calculating the speed of sound from the measured delays can be determined from the engine-specific geometric data, for example by utilizing the crank angle reference. For the ultrasonic delay measuring device, this paper proposes accommodating the ultrasonic transducer in an associated housing and screwing it into the cylinder head like a spark plug.

International Patent Document WO 91/19966 describes a pressure and heat flow sensor for the combustion chamber of an internal combustion engine, in which a pressure sensor element (for example, a piezoelectric element) and a heat-flow sensor element, comprising two temperature sensors, are integrated in a common housing.

One object of the present invention is to provide a pressure and temperature sensor of the type described above which is comparatively compact.

Another object of the invention is to achieve a reliable determination of the pressure and temperature of a gas in a hollow space, particularly a fuel/air mixture in the combustion chamber of an internal combustion engine.

Yet another object of the invention is to provide an operating method which achieves such reliable results.

These and other objects and advantages are achieved by the measuring method and application according to the invention, which comprises a combined pressure-sensor and ultrasonic-transducer unit with a measuring element that serves both for pressure measurement and as an ultrasonic transducer element for temperature determination by ultrasonic delay measurement. By integrating the pressure and temperature measuring functions into a single measuring element, the device can be made very compact and can therefore be located without any problem, for example, in the combustion chamber of an internal combustion engine. There is no need to provide separate pressure and temperature sensors in order to determine the pressure and temperature of a gas in a hollow space of known dimensions. Moreover, by providing this device at the combustion chamber of an internal combustion engine, the air mass in the combustion chamber can be calculated, even in non-steady-state phases of engine operation, comparatively accurately, using the aid of the ideal gas equation and the measured values for combustion chamber pressure and temperature.

With the pressure-sensor and ultrasonic-transducer unit combined in an integrated component of a spark plug, apart from the installation space already provided for the spark plug, no further space is required for the provision of pressure and temperature sensor elements on the combustion chamber walls.

Other objects, advantages and novel features of the present invention will become apparent from the following detailed description of the invention when considered in conjunction with the accompanying drawings.

BRIEF DESCRIPTION OF THE DRAWINGS

The single FIGURE is a schematic block-diagram of a device for determining the pressure and temperature of a fuel/air mixture in the combustion chamber of an internal combustion engine.

DETAILED DESCRIPTION OF THE DRAWINGS

The device schematically shown in the FIGURE in block diagram form can be used specifically for determining the pressure and temperature of a fuel/air mixture in a combustion chamber of the internal combustion engine of a motor vehicle. The temperature can be determined by ultrasonic delay measurements with a known transit length (i.e., distance) by the relationship $a^2 = k \times R \times T$ for the speed of sound a as a function of the gas constant R, the gas temperature T and the quotient k of the thermal capacities $c_p$ at constant pressure and $c_v$ at constant volume, which for their part are dependent only on the temperature T. That is, $k(T) = c_p(T)/c_v(T)$. The transit length can be calculated, for example, by using the crank angle reference and engine-specific data. The pressure is sensed directly by means of sensors.

Shown schematically in the figure is a cylinder 1 of a motor-vehicle internal combustion engine of the reciprocating piston type. A suitable fuel/air mixture can be introduced into the combustion chamber 2 via an intake pipe 3 and an inlet valve 4, and is ignited by a spark plug 5 protruding into the combustion chamber 2 from above. Exhaust gas produced by the combustion process in the combustion chamber 2 is carried away via an outlet valve 6 and an adjoining exhaust gas pipe 7.

The spark plug 5 characteristically contains the device 5a for determining the pressure and temperature of the fuel/air mixture introduced into the combustion chamber 2, in the form of a combined pressure-sensor and ultrasonic-transducer unit, which has a single measuring element in the form of an activatable piezoelectric sensor platelet. This piezoelectric sensor platelet 5a serves both for measuring pressure, and for sending and receiving ultrasonic waves if it is correspondingly activated in an ultrasonic transducer function. Such activation takes place by means of a control unit 8 of the pressure and temperature determination device, which may be, for example, an integrated component part of an engine control device.

With this arrangement, it is possible to determine both the pressure (by means of the piezoelectric sensor platelet 5a) and the temperature (by means of ultrasonic delay measurements of the ultrasonic waves transmitted and received by the sensor platelet) of the gas in the combustion chamber 2, without need of separate pressure and temperature sensors arranged at the cylinder 1, and without having to integrate separate pressure and temperature detecting elements into the spark plug 5 or some other component in contact with the combustion chamber 2. The following two methods are particularly appropriate for carrying out the pressure and ultrasonic delay measurements.

In a first possible procedure, the control unit 8 instigates a short ultrasonic delay measurement at preset time intervals, while at the other times it activates the piezoelectric sensor platelet 5a as a pressure measuring element. At the beginning of an ultrasonic delay measurement, the control unit 8 activates the piezoelectric sensor platelet 5a in the spark plug 5 to transmit a typical ultrasonic wave pulse 9, shown diagrammatically in the figure. In its ultrasonic transducer mode, the piezoelectric sensor platelet subsequently detects the ultrasonic wave pulse 12 reflected from the opposite head 10 of the reciprocating piston 11, also shown diagrammatically in the figure.

From the temporal displacement dt of this reflected pulse 12 in relation to the excitation pulse 9, which reflects the delay (transit time) of the ultrasonic wave pulse, the control unit 8 initially determines the speed of sound of the gas in the combustion chamber 2. For this purpose, it requires the distance of the reflecting piston head 10 from the piezoelectric sensor platelet, which can be calculated from the known crank angle reference (i.e., the position of the crankshaft and consequently of the piston 11 at the point in time of the delay measurement) and known engine-specific data regarding engine geometry. From the speed of sound, the control unit 8 then determines the temperature of the gas in the combustion chamber 2 on the basis of the known relationship (specified above) between these two variables. Using the ideal gas equation, the air mass in the combustion chamber 2 can then be determined on the basis of the pressure and temperature values determined, as likewise mentioned above. The measuring operations, and consequently the air mass determination, are preferably performed during the compression phase after closing of the inlet valve 4, since they are then not influenced by possible non-steady state effects.

Once ultrasonic delay measurement has been completed, in the case of this first variant of the method according to the invention, the piezoelectric sensor platelet 5a is available again for combustion-chamber pressure measurements. In these pressure measuring phases, the sensor platelet is excited at a suitable pressure measuring frequency and the pressure measuring signal 13 obtained, again illustrated diagrammatically in the figure, is evaluated by a suitable combustion-chamber pressure evaluation 14 (preferably realized as software) of the control unit 8 for obtaining the combustion chamber pressure.

A second procedure for the pressure and ultrasonic delay measurement, as an alternative to the first procedure, is to excite the piezoelectric sensor platelet 5a constantly at the pressure measuring frequency, and therefore to use it continuously as a pressure measuring element, superimposing the ultrasonic excitation signal onto the combustion-chamber pressure measuring signal at desired points in time. In this way, at such points in time the sensor platelet is used simultaneously as a pressure measuring element and as an ultrasonic transducer element. The combustion-chamber pressure measuring signal is in this case superimposed by the exciting ultrasonic wave signal and by the reflected ultrasonic wave signal.

In this alternative, suitable signal processing is implemented in the control unit 8, with which the actual combustion-chamber pressure measuring signal as well as the exciting ultrasonic wave signal and the reflected ultrasonic wave signal (which are combined in the output signal of the sensor platelet) can be separated from the one another. Thereafter, these signals can be evaluated to determine the pressure and the ultrasonic delay. From the ultrasonic delay determined, the control unit 8 is then again able to conclude the temperature of the combustion chamber gas (i.e., of the fuel/air mixture). If appropriately short intervals are chosen between two ultrasonic wave excitations, a virtually continuous determination of the pressure and temperature of the gas in the combustion chamber 2 is possible with this procedure.

As described with reference to the first variant of the method, using the second variant the air mass in the combustion chamber 2 for each operating cycle (and consequently the engine load) can be sensed comparatively accurately in the same way from the pressure and temperature determination, not only in the case of steady-state engine operation but also specifically in the case of non-steady-state engine operation.

It is apparent that the device according to the invention and the method according to the invention are suitable not only for determining the pressure and temperature of a gas in the combustion chamber of an internal combustion engine but of any desired gas located in a hollow space of known dimensions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for determining pressure and temperature of a gas in an enclosure, said device comprising a pressure-sensitive measuring element arranged in said enclosure, which pressure-sensitive measuring element (5) is also operable as a transmitting and receiving element for ultrasonic pulses for determining the temperature based on a propagation time of the ultrasonic pulses along a given path.

2. The device according to claim 1, wherein said enclosure is a combustion chamber of an internal combustion engine.

3. The device according to claim 1, wherein said pressure sensitive measuring element is integrated with a spark plug.

4. The device according to claim 1, further comprising:
a control unit which controls operation of said pressure sensitive measuring element, causing said pressure sensitive measuring element intermittently to transmit and receive ultrasonic pulses, said control unit determining the temperature of the gas as a function of a delay time between transmitted and received pulses, and said control unit causing said pressure sensitive measuring element to sense pressure in said gas, at least when said pressure sensitive measuring element is not transmitting and receiving ultrasonic pulses.

5. A method of operating a device for determining pressure and temperature of a gas in an enclosure having a pressure-sensitive measuring element arranged in said enclosure, which pressure-sensitive measuring element (5) is also operable as a transmitting and receiving element for ultrasonic pulses for determining the temperature based on a propagation time of the ultrasonic pulses along a given path, said method comprising:
activating the measuring element at different points in time as a pressure measuring element and as an ultrasonic transducer element.

6. A method of operating a device for determining pressure and temperature of a gas in an enclosure having a pressure-sensitive measuring element arranged in said enclosure, which pressure-sensitive measuring element (5) is also operable as a transmitting and receiving element for ultrasonic pulses for determining the temperature based on a propagation time of the ultrasonic pulses along a given path, said method comprising:
activating said pressure-sensitive measuring element continuously as a pressure measuring element;
intermittently additionally activating said pressure-sensitive measuring element as a transmitting and receiving element for ultrasonic pulses, whereby a pressure measuring signal is superimposed with an ultrasonic delay measuring pulse signal;
separating received ultrasonic delay measuring pulse signals from said pressure measuring signal; and
processing said separated signals to determine pressure and temperature of said gas in said enclosure.

7. A device for determining pressure and temperature of a gas in an enclosure, comprising:
an electromechanical pressure sensitive element situated in said enclosure, said pressure sensitive element having a first mode of operation for sensing pressure of said gas, and a second mode of operation for determining temperature of said gas by generating ultrasonic pulses for propagation through said gas and detecting reflected ultrasonic pulses; and
a control unit which controls operation of said electromechanical pressure sensitive element in said, first and second modes, causing said pressure sensitive element intermittently, to operate in said second mode, generating ultrasonic pulses and detecting reflections thereof, said control unit determining the temperature of the gas as a function of a delay time between generated and reflected ultrasonic pulses, and causing said pressure sensitive element to operate in said first mode for sensing pressure at least when said pressure sensitive element is not operating in said second mode.

8. The device according to claim 7, wherein said enclosure is a combustion chamber of an internal combustion engine.

9. The device according to claim 8, wherein said pressure sensitive element is integrated with a spark plug.

\* \* \* \* \*